May 8, 1923.
F. ROBBINS
1,454,411
MACHINE FOR REMOVING THE CORES AND STONES FROM FRUIT
Filed May 19, 1922
2 Sheets-Sheet 1
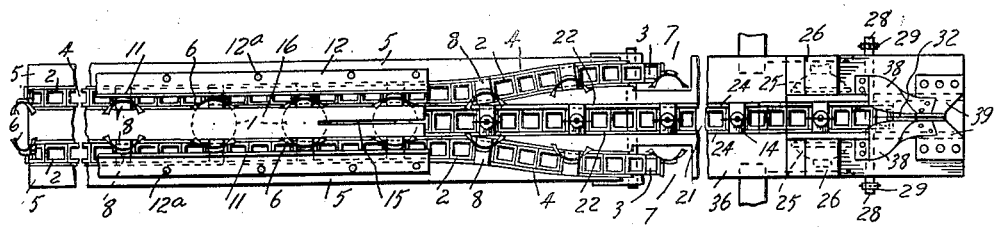
Fig. 1.
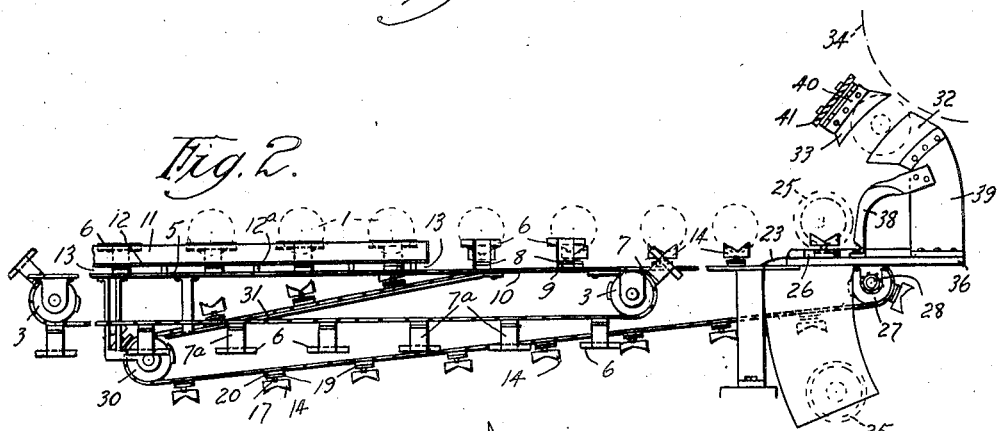
Fig. 2.
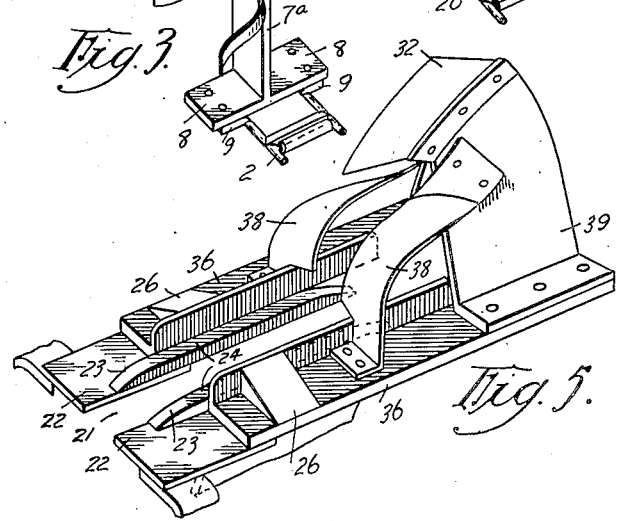
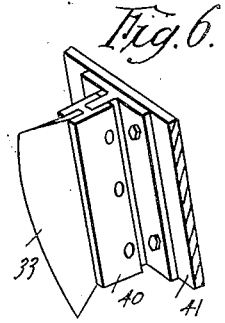
INVENTOR
Frank Robbins
BY
HIS ATTORNEYS

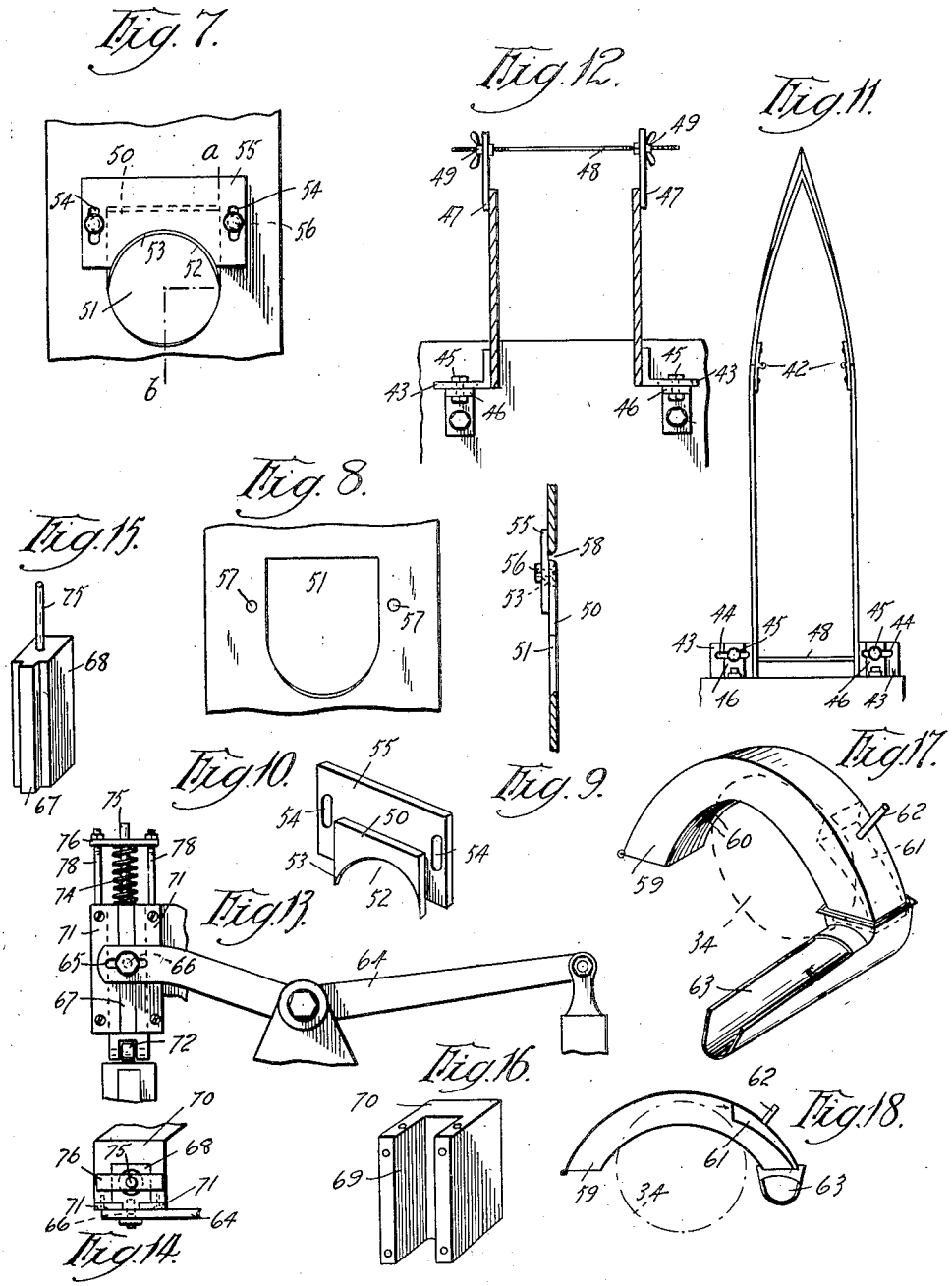

Patented May 8, 1923.

1,454,411

UNITED STATES PATENT OFFICE.

FRANK ROBBINS, OF CLIFTON HILL, VICTORIA, AUSTRALIA, ASSIGNOR TO GEORGE EDWARD ANDREW, OF RICHMOND, AUSTRALIA.

MACHINE FOR REMOVING THE CORES AND STONES FROM FRUIT.

Application filed May 19, 1922. Serial No. 562,052.

*To all whom it may concern:*

Be it known that I, FRANK ROBBINS, a subject of the King of Great Britain, residing at 94 Ramsden Street, Clifton Hill, in the State of Victoria, Australia, have invented certain new and useful Improvements in Machines for Removing the Cores and Stones from Fruit; and I do declare the following to be a full, clear, and exact description of the invention, such as will enable others skilled in the art to which it appertains, to make and use the same.

This invention has been devised to provide improvements in and relating to machines for removing the stones from fruit, and refers to that type of machine described and illustrated in my U. S. A. Patent No. 1,387,-183/21. The improvements embrace means whereby the feeding to and discharge of the fruit from the machine and the operations appertaining thereto will be greatly facilitated, enabling the cutting or the halving of the fruit to be more effectively accomplished, and during such operations the halved stone or core will be removed without fear of injury to the semi-rotary or rotary knife hereinafter described.

In order that my invention may be the more easily understood reference will be made to the accompanying sheets of drawings in which—

Fig. 1 is a plan of means for feeding the whole fruit.

Fig. 2 is a side elevation of Fig. 1.

Fig. 3 illustrates a clip and connections for supporting the whole fruit.

Fig. 4 shows a form of spikes or knives for insertion in and conveying the whole fruit to a predetermined point.

Fig. 5 illustrates drawn to a larger scale apparatus hereinafter described, a buffer or guide and a guide knife.

Fig. 6 is a view showing a bracket for supporting one of the guide knives hereafter described.

Fig. 7 is a side elevation of one of the director plates showing the interior with means for providing a cutting edge to ensure a clean sharp cut in the fruit during the rotary or semi-rotary motion of the knife.

Fig. 8 is a further illustration of parts illustrated in Fig. 7.

Fig. 9 is a section on line *a—b* of Fig. 7.

Fig. 10 illustrates the movable insertion plate hereafter described.

Fig. 11 is an end elevation of the director plates with means for adjusting same for the purpose hereafter referred to.

Fig. 12 is a sectional plan view of Fig. 11.

Fig. 13 is a side elevation of actuating means hereafter described.

Fig. 14 is a plan view of part of Fig. 13.

Figs. 15 and 16 show details of the apparatus illustrated in Fig. 13.

Fig. 17 is a view of means employed to catch and convey the saw-dust during cutting operations whilst Fig. 18 is a sectional view of means illustrated in Fig. 17.

In this invention the whole fruit 1 is carried to meet the rotary cups described in my U. S. A. Patent No. 1,387,183/21 by a conveyor comprising parallel sprocket chains, the links 2 of which engage and are actuated by sprocket wheels 3 receiving motion from any convenient power. The links 2 run in parallel guide channels 4 provided in horizontal plates 5. The contour of said channels at their inner ends direct the clips 6 through an opening 7 at the inner end of each plate 5 clear of obstructions. Each clip 6 is supported by a pillar 7ª integral with a flat plate 8 disposed on and secured to the wings 9 of the respective link 2 of the sprocket chain aforesaid at desired intervals apart. During the travel of the sprocket chain the wings 9 will run on rails 10 formed by the edges of the horizontal plate 5. During such arrangement the links 2 by the aid of the wings 9 are held in suspension within their respective channels 4. It is essential whilst carrying the fruit that the clips 6 be retained in a position to effectively grip and hold the fruit. To do this any tendency on the part of the chain to rise whilst the holding or tension pressure of the clips is exerted must be obviated. To accomplish this purpose the pillar at the rear is curved and during its forward movement is in contact with the vertical wall 11 of the plate 12 secured to and above the plate 5, the horizontal flat surface of the plate 12 is supported by standards 12ª above the plate 5, providing a channel 13 to help in retaining the plate 8 in its predetermined running position, whilst the whole fruit is being conveyed by the clips 6. The fruit on reaching a desired point meets the vertical spikes or knives 14 which during their forward and upward movement pass through the longitudinal slot 15 in the strip 16. During such action the spikes or knives 14 become embedded centrally in the under portion of the fruit and help the clips 6 to convey it to a point where the clips 6 make a side and outward movement by reason of the contour of the channels 4, simultaneously becoming released from engagement with the whole fruit.

Referring to the spikes or knives 14, the lower end of each is attached to a stem 17 screwed into a boss 18, integral with a plate 19 similar in construction to the plate 8, also attached in an identical manner to a link 20 of the sprocket chain at desired intervals apart, but adjusted in position to meet the whole fruit as the top of the spikes in their upward and forward motion pass through the longitudinal slot 15. The sprocket chain carrying the spikes or knives 14 travels in a central guide channel 21 see Fig. 5, the edges 22 of which form rails for the wings 9 supporting the plates 19. The sprocket chain in its forward movement travels forwardly along the track formed by the edges 22, during such movement each of the plates 19 will meet the inclined surface 23 over which it passes and in doing so is raised to the level of the track 24 placing the whole fruit in a higher and a better position to be caught by the cups 25, as the latter reach the end of the slide blocks 26 in their gradual forward and upward movement towards the centre of the track; the last mentioned sprocket chain continues its movement along the track 24 and upon leaving it engages the sprocket wheel 27 on the spindle 28 actuated by sprocket wheels 29 thereon, and chain (not shown) receiving motion from any suitable source. From the sprocket wheel 27 the chain travels to the sprocket wheel 30, leaving the latter it is directed by and travels up the inclined guide 31 to a position to meet the whole fruit in the manner before described. The spikes or knives 14 are positioned centrally, i. e. in alignment with the centre of the whole fruit 1 carried by the clips 6. This arrangement enables the whole fruit to be conveyed to meet at its centre or approximately so a pair of cutting or guide knives 32 and 33 hereinafter referred to. The fruit as it adheres to the spikes or knives 14 is conveyed towards the cutting saw 34 (shown in dotted lines) or the like of the machine, and on reaching a predetermined position the sliding rotary travelling cups 25 before referred to (one on each side) simultaneously rise and grasp the fruit. These cups 25 in their upward and simultaneously rotary movement, just previous to the gripping action referred to, slide forward on the angle guide blocks 26 aforesaid each of which are fixed on the flat horizontal plate 36 fixed in any suitable manner to the plate 5 and to the frame of the machine. The sliding movement of each cup 25 as stated before is gradual, having the effect of gripping the fruit without fear of injury to same, at the same time holding it firmly in the predetermined central position for cutting.

Positioned adjacent to the guide blocks 26 and fixed to each plate 36 and arms 37 are angular guards or buffers 38 which meet and remove the whole fruit from the spikes or knives 14 should by any means the cups 25 fail to gather the fruit whilst being conveyed forwardly on the spikes or knives 14.

A little while after the fruit is detached from the spikes or knives 14 and gathered by the cups 25 during the rotary and upward movement of same it meets the pair of guide knives 32 and 33 aforesaid and fixed in a central position, i. e. in alignment with the spikes or knives 14 aforesaid, the knife 32 is secured at the top of a pair of curved arms 39 fixed at the inner ends of the plate 36 before mentioned. The knife blade 32 is curved to correspond with the circumferential movement or curve taken by the cups during operations and makes contact with the fruit diagonally, the blade of the other or second knife 33 has a similar curve and is supported by a bracket 40 fixed to the stay bar 41 at the front of the machine. The said pair of knives 32 and 33 make a preliminary and preferably central cut in the fruit, the opening being of sufficient width and depth to allow the fragments from the stone or the like during the sawing or halving operations to freely pass between the walls of the cut and so obviate the entry of fragments of the stone into the meat or flesh of the fruit.

To permit a deep or shallow cut in the halved fruit of the rotary or semi-rotary actuating knives (not shown) the lower portion of the V-shaped director is hinged at 42 (see Fig. 11), the front lower ends having a lug piece 43 provided with a longitudinal slot 44 with adjusting bolt 45 fixed to lug piece 46 attached to the frame of the machine, the rear portion of such lower ends is provided with arms 47 with connecting adjustable rod 48 having threaded rods for wing nut 49. By adjusting the bolt 43 within the slot 44 and the winged nuts 49 the lower hinged portion of the director is brought with the halved fruit closer or further away from its normal position, the cut of the rotary or semi-rotary knife will thus be made deeper or shallower in the halved fruit accordingly.

It is essential that when removing the stone or core from the halved fruit that a clean, sharp cut be made in the flesh or meat of the fruit, to facilitate this object a movable and adjustable insertion piece 50 is disposed within an aperture 51 in both plates of the director above the opening in and through which the rotary or semi-rotary knife passes during its motion. The insertion piece 50 has a semi-circular bite 52 with a beveled edge 53 which when the cutting operations are being performed provides together with the rotary knife a shearing face ensuring that the cutting edge of such knife entering the flesh or meat of the fruit simultaneously and decisively, thus making a clean cut which is continued through the flesh or meat of the fruit. The insertion piece 50 is capable of adjustment to agree with the set position of the hinged plates of the director, such adjustment is accomplished by the aid of longitudinal slots 54 in the plate 55 which is in contact with the interior wall of the respective plate forming the director, an adjustable bolt 56 with head and face for screwdriver passes through the slot 54 and a hole 57 in the plates of the director. The insertion piece 50 is integral with the plate 55 and projects from same, on adjusting the insertion piece to a lower position with the opening a space 58 will exist and it is desirable that the top edges of both the opening 48 and plate 55 be chamfered to obviate obstruction to the surface of the halved fruit as it descends.

The fragments caused during the sawing of the stone, core and the like will be thrown into the cover 59 disposed above the saw 34, such cover 59 having internal flanges 60 and channel 61 so arranged that the fragments will be thrown into the channel 61 where they will meet flowing water entering through the pipe 62, the water flowing and taking the saw-dust or fragments into the chute 63 attached to the end of the cover 59 from which they will be discharged into a suitable receptacle. It is desirable that the semi or rotary knives (not shown) should have a continuous motion to aid in conjunction with the adjustable means provided in the director plate to ensure a clean cut in the flesh or meat of the halved fruit, such motion is imparted through the rack-bar by the lever 64, the outer end of which is provided with a longitudinal slot 65 in which actuates a pin 66 fixed to the projecting face 67 of a sliding block 68 operating in a recess 69 provided in the block 70, the sliding block 68 being maintained in such recess 69 by front plates 71 secured to the front of the stationary block 70. The lower end of the sliding block 68 carries a roller 72 which engages a cam 73 mounted on a suitable shaft (not shown) at the rear of the machine. The motion of the lever 64 is facilitated by a coil spring 74 disposed on the top of the block 68 and retained in position by the central shank 75 sliding in a top plate 76 supported by pillars 78 fixed to the top of the stationary block 70.

I claim:—

1. In a machine for removing cores and stones from fruit, devices for obtaining a central or approximately central cut in the fruit comprising a conveyor, fruit engaging means carried by the conveyor, adjustable cup members, stationary knives, and an auxiliary conveyor carrying spikes which engage the fruit and deliver it at a point where it is engaged by the said adjustable cup members to which there is imparted a rotary and lateral sliding movement to receive the fruit and by which the fruit is conveyed between the said stationary knives to make the central or approximately central cut therein.

2. In a machine for removing cores and stones from fruit, means for obtaining a central or approximately central cut in the whole fruit comprising a sprocket chain, clips attached thereto, guide plates and channels, adjustable cup members, stationary knives, a central actuating sprocket chain carrying spikes which engage the whole fruit and deliver it to a point where it is gathered by said adjustable cups having a rotary and gradual sliding lateral movement to receive the fruit, and by which it is conveyed between said stationary knives which make a central cut in the fruit, means for moving and directing the motion of the sprocket chains, and a buffer or guide.

3. In a machine for removing cores and stones from fruit, devices for feeding, receiving and holding the fruit, means for halving the fruit while being held by said devices, a V-shaped director having spaced walls upon which the halved fruit slides, means for adjusting such V-shaped director to regulate the depth of cut within the flesh or meat of the fruit comprising hinged walls so as to allow the lower ends of the V-shaped director to be moved inwardly or outwardy, adjustable bolts with nuts, screw threaded rod with winged nuts, means for imparting a clean and sharp cut to the meat or flesh of the fruit comprising a plurality of curved knives each operating in an opening provided in the walls of the said director, and an insertion plate having a beveled cutting edge.

4. In a machine for removing cores and stones from fruit: devices for feeding, receiving and holding the fruit, means for halving the fruit, a V-shaped director having spaced walls, in each of which there is an opening, a curved knife operating through an opening in each wall of the director, a lever one end of which is provided with a longitudinal slot, a pin in said slot, a sliding block to which said pin is attached, a stationary block having a recess in which said sliding block operates, a roller carried by sliding block, a cam engaged by said roller, a coil spring imparting motion to the sliding block, means for receiving and discharging the sawdust or fragments of the stone or core of the fruit consisting of a cover with internal flanges and channel, a water supply pipe, and a discharge chute.

In testimony whereof I have signed my name to this specification in the presence of two subscribing witnesses.

FRANK ROBBINS.

Witnesses:
  AUGUSTINE THOMAS MADDEN,
  IVY DONOHUE.